(12) United States Patent
Shetty et al.

(10) Patent No.: US 6,966,059 B1
(45) Date of Patent: Nov. 15, 2005

(54) SYSTEM AND METHOD FOR PROVIDING AUTOMATED LOW BANDWIDTH UPDATES OF COMPUTER ANTI-VIRUS APPLICATION COMPONENTS

(75) Inventors: Satish Shetty, Beaverton, OR (US); Harvir Singh, Hillsboro, OR (US); Michael Bacus, Tigard, OR (US)

(73) Assignee: McAfee, Inc., Santa Clara, CA (US)

( * ) Notice: Subject to any disclaimer, the term of this patent is extended or adjusted under 35 U.S.C. 154(b) by 651 days.

(21) Appl. No.: 10/096,012

(22) Filed: Mar. 11, 2002

(51) Int. Cl.[7] .............................................. G06F 9/44
(52) U.S. Cl. ...................... 717/172; 717/169; 717/173; 709/210; 713/188
(58) Field of Search ............................... 717/168–173; 714/38, 784, 764; 709/217–219; 713/188

(56) References Cited

U.S. PATENT DOCUMENTS 6,035,423 A * 3/2000 Hodges et al. ................ 714/38
6,278,716 B1 * 8/2001 Rubenstein et al. ........ 370/432

OTHER PUBLICATIONS

"Virus Information Library," http://vi.mcafee.com; Networks Associates, Inc., 2001.
Stephens W R, "TCP/IP Illustrated: The Protocols; vol. 1," Ch. 1-2, 6, 1999, Addison-Wesley, USA.
"Reed-Solomon Codes," http://www.4i2i.com/reed_solomon_codes.htm, 4i2i Communications, Ltd., 1998.
Stevens, Richard W. The Protocols: TCP/IP Illustrated, vol. 1, Jul. 2001.
McAfee, "Virus Information" http://us.mcafee.com/virusInfo/default.asp?WWW_URL=www.mcafee.com/anti-virus/default.asp.

* cited by examiner

*Primary Examiner*—Kakali Chaki
*Assistant Examiner*—Lawrence Shrader
(74) *Attorney, Agent, or Firm*—Zilka-Kotab, PC; Christopher J. Hamaty

(57) ABSTRACT

A system and method for providing automated low bandwidth updates of computer anti-virus application components is described. Components of one or more deployed computer anti-virus applications requiring updating are periodically identified. Each updated computer anti-virus application component is pulled from a component repository on a centralized component server by a replicator. Each out-of-date computer anti-virus application component is updated. The one or more updated computer anti-virus application components for the computer anti-virus applications are pushed to superagents. The updated computer anti-virus application components to the deployed computer anti-virus applications are multicast to agents.

39 Claims, 10 Drawing Sheets

Figure 7 (con'd).
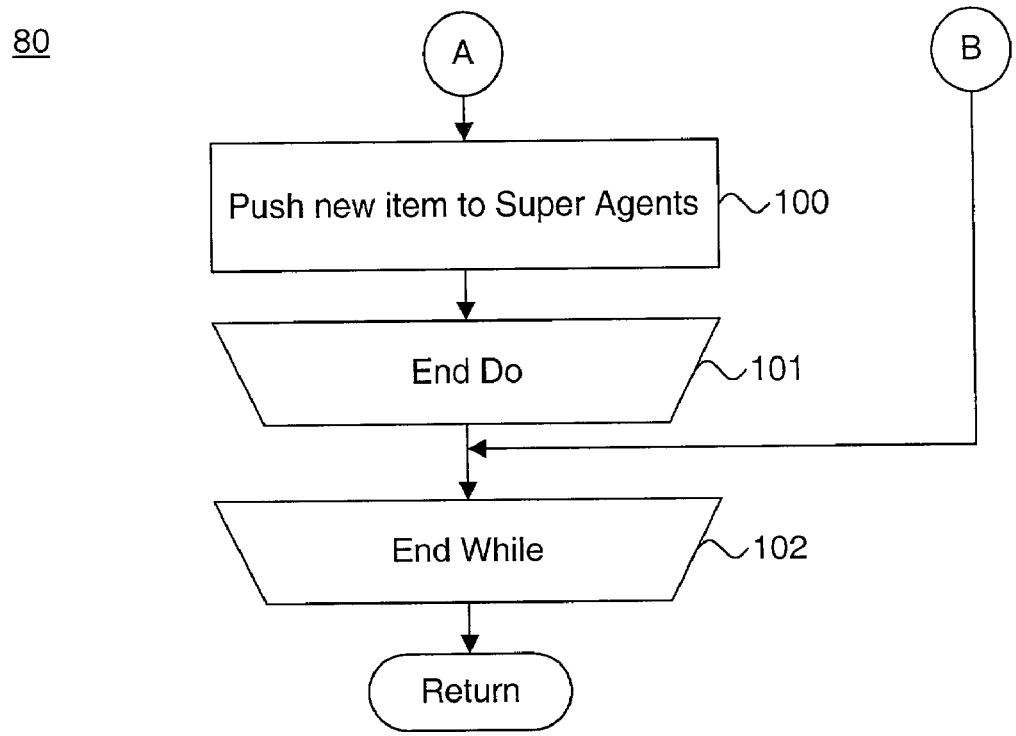

110

120

SYSTEM AND METHOD FOR PROVIDING AUTOMATED LOW BANDWIDTH UPDATES OF COMPUTER ANTI-VIRUS APPLICATION COMPONENTS

FIELD OF THE INVENTION

The present invention relates in general to computer anti-virus application component updating and, in particular, to a system and method for providing automated low bandwidth updates of computer anti-virus application components.

BACKGROUND OF THE INVENTION

Computer viruses, or simply "viruses," are executable programs or procedures, often masquerading as legitimate files, messages or attachments that cause malicious and sometimes destructive results. More precisely, computer viruses include any form of self-replicating computer code which can be stored, disseminated, and directly or indirectly executed by unsuspecting clients. Viruses travel between machines over network connections or via infected media and can be executable code disguised as application programs, functions, macros, electronic mail (email) attachments, images, applets, and even hypertext links.

The earliest computer viruses infected boot sectors and files. Over time, computer viruses became increasingly sophisticated and diversified into various genre, including cavity, cluster, companion, direct action, encrypting, multipartite, mutating, polymorphic, overwriting, self-garbling, and stealth viruses, such as described in "Virus Information Library," http://vil.mcafee.com/default.asp?, Networks Associates Technology, Inc., (2001), the disclosure of which is incorporated by reference. Macro viruses are presently the most popular form of virus. These viruses are written as scripts in macro programming languages, which are often included with email as innocuous-looking attachments.

Historically, anti-virus solutions have reflected the sophistication of the viruses being combated. The first anti-virus solutions were stand-alone programs for identifying and disabling viruses. Eventually, anti-virus solutions grew to include specialized functions and parameterized variables that could be stored in a data file. During operation, the data file was read by an anti-virus engine operating on a client computer. Finally, the specialized functions evolved into full-fledged anti-virus languages for defining virus scanning and cleaning, including removal and disablement, instructions.

Presently, most anti-virus companies store the anti-virus language code for each virus definition into data files. For efficiency, the source code is compiled into object code at the vendor site. The virus definitions, including the object code, are then stored into the data files. To speed virus detection, the virus definitions are organized for efficient retrieval often as unstructured binary data.

Anti-virus companies are continually discovering new computer viruses on a daily basis and must periodically distribute anti-virus software updates. Each update augments the data file with new computer virus definitions, as well as replacing or deleting old virus definitions. Over time, however, the size of the data files tend to become large and can take excessive amounts of time to download. Long download times are particularly problematic on low bandwidth connections or in corporate computing environments having a large user base.

Anti-virus software maintenance is labor intensive and time-consuming but critical to maintaining an effective defense to the threats posed by computer viruses, malware, and other bad content. Updated computer virus definitions and computer anti-virus application components must be installed and configured at each client system. Moreover, during an emergency, such as arising due to a new form of aggressive computer virus, computer virus definitions must be rapidly disseminated and installed to protect against the computer virus.

Disseminating computer virus definitions and anti-virus application components to each client separately consumes significant amounts of bandwidth and processing resources. The bandwidth consumed by a single update can downloaded patches and DATs and multicasts the updates to individual agents for updating and installation. The hierarchical structuring of the replicator-superagent-agent topology allows rapid dissemination of computer anti-virus application components without significant delay or bandwidth and resource consumption.

An embodiment provides a system and method for efficiently disseminating computer anti-virus system components. A repository of computer anti-virus system components cataloged in an on-line directory is maintained. The on-line directory is periodically accessed to identify those computer anti-virus system components in deployed clients requiring updating. The identified computer anti-virus system components are pulling and forwarded to select superagents within a defined network domain. The identified computer anti-virus system components are multicast to each deployed client.

A further embodiment provides a system and a method for providing automated low bandwidth updates of computer anti-virus application components. Components of one or more deployed computer anti-virus applications requiring updating are periodically identified. Each updated computer anti-virus application component is pulled from a component repository on a centralized component server by a replicator. Each out-of-date computer anti-virus application component is updated. The one or more updated computer anti-virus application components for the computer anti-virus applications are pushed to superagents. The updated computer anti-virus application components to the deployed computer anti-virus applications are multicast to agents.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and quickly become unmanageable as duplicate copies are routed to the various clients.

In the prior art, unnecessary data duplication and bandwidth consumption have been avoided through the use of tiered updating architectures. Each update originates at a centralized server which sends one copy of the updated computer virus definition to a single client. The client copies the updated computer virus definition before forwarding the complete definition on to a subsequent client. The updating sequence is repeated until every client has been updated in round-robin fashion. However, this approach is inherently serial and the update cycle can halt due to a single client failure. Thus, the reliance on a single client creates a bottleneck to the rapid dissemination of updates.

Therefore, there is a need for an approach to providing efficient dissemination of computer virus definitions and anti-virus application components. Preferably, such an approach should avoid unnecessary bandwidth consumption lost through duplicate downloads and wasted storage.

There is a further need for a rapid and responsive approach to computer anti-virus application component dissemination. Preferably, such an approach should use low bandwidth and be capable of sending ad hoc updates without notice. In addition, a repository of updates should be maintained for those clients that fail to receive periodic updates.

SUMMARY OF THE INVENTION

The present invention provides a system and method for automatically and asynchronously updating computer anti-virus system components in a hierarchical and bandwidth efficient fashion. New patches to computer anti-virus applications and computer virus definitions (DATs) are maintained in repositories on centralized servers, preferably implemented using the Hypertext Transport Protocol (HTTP) or File Transport Protocol (FTP). Periodically, a replicator downloads directories of the patches and DATs to determine those anti-virus system components that are out-of-date. The patches and DATs are pulled by the replicator into local storage and subsequently pushed to selected superagents executing within the bounded network domain. Each superagent receives the detailed description are to be regarded as illustrative in nature and not as restrictive.

DETAILED DESCRIPTION

Figure 1:
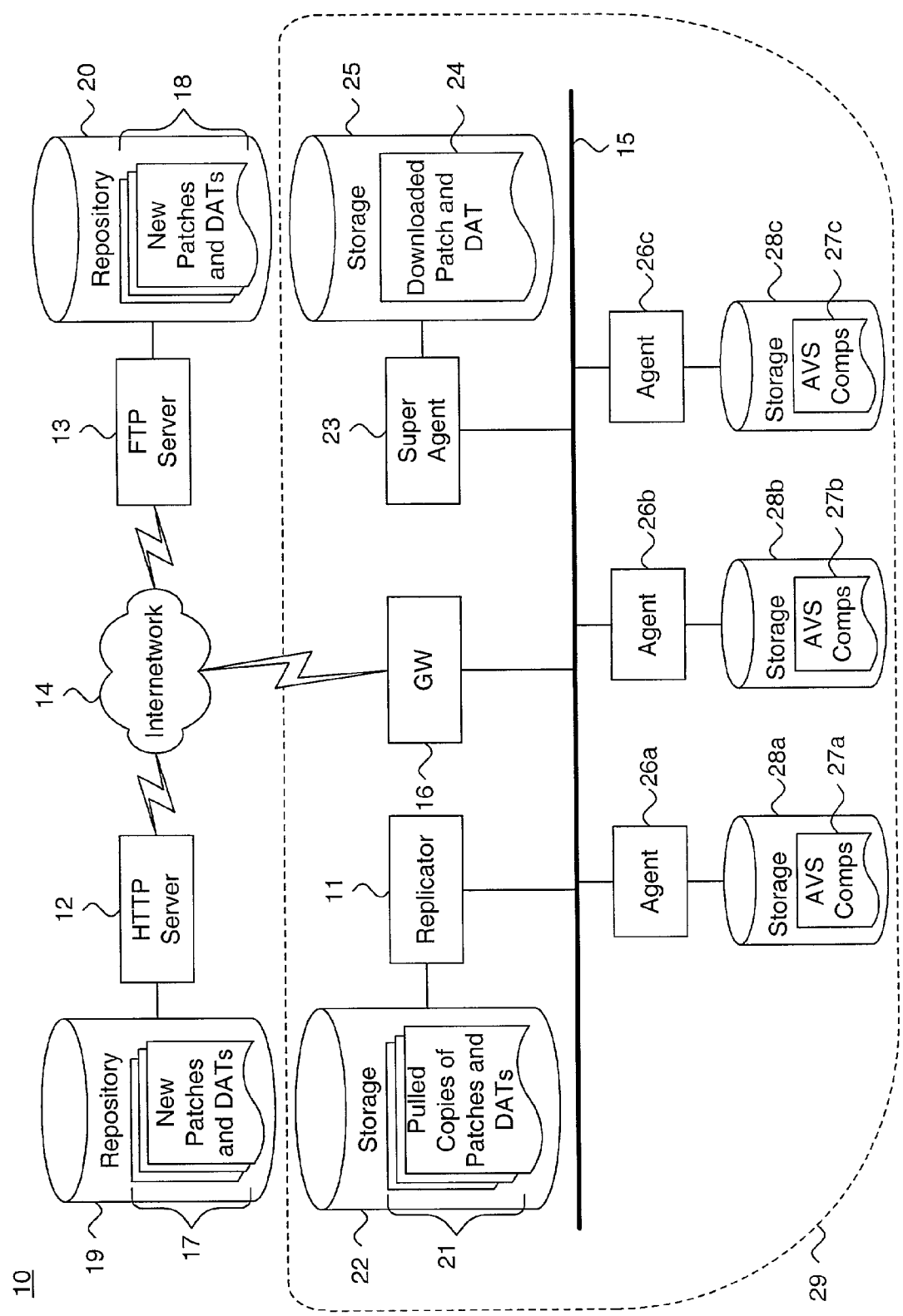
FIG. 1 is a block diagram showing a system for providing automated low bandwidth updates of computer anti-virus application components, in accordance with the present invention.

FIG. 1 is a block diagram showing a system for providing automated low bandwidth updates of computer anti-virus application components 10, in accordance with the present invention. By way of example, a gateway 16 (or bridge, router, or similar packet routing device) interfaces an intranetwork 15 to an internetwork 14, including the Internet. The intranetwork 15 interconnects one or more servers, such as Hypertext Transport Protocol (HTTP) server 12 or File Transfer Protocol (FTP) server 13, with one or more agents 26a–c within a bounded network domain 29 defined by a common network address space. Each server 12, 13 includes a storage repository 19, 20 respectively, for common file storage and sharing. The agents 26a–c also include storage devices 28a–c.

The gateway 16 operates as a store-and-forward packet routing device, which processes a high volume of packet traffic transiting across the network domain boundary. The gateway 16 provides an efficient solution to interfacing the individual servers 12, 13 and agents 26a–c to external systems operating over the internetwork 14. Optionally, a firewall (not shown) can provide limited security to the intranetwork 15 by providing filtering of packets originating from unauthorized users. Other network topologies and configurations are feasible, as would be recognized by one skilled in the art.

Each agent 26a–c executes an anti-virus system (AVS), as further described below with reference to FIG. 5, to analyze message packets incoming to the bounded network domain 29 for the presence of computer viruses, malware, and other bad content. The agents 26a–c maintain the anti-virus system and associated computer virus definitions (DATs) as anti-virus system (AVS) components 27a–c, respectively. The anti-virus system components 27a–c must be periodically updated with new components and DATs as necessary. The updating of the computer anti-virus application components is effected through patching while the DATs are appended or replaced as needed.

Sets of new patches and DATs 17, 18 are respectively maintained in the repositories 19, 20 of the HTTP server 12 and FTP server 13. Within the bounded network domain 29, a specialized client, known as a replicator 11, periodically generates a "ping" message, preferably as an Internet Control Message Protocol (ICMP) query, to the HTTP server 12 or FTP server 13 to obtain a current set of directories of anti-virus system components and DATs. If updates are required, the replicator 11 pulls copies of the new patches and DATs into a local storage device 22. The replicator 11 pushes the copied patches and DATs 21 to dynamically selected superagents 23 within the bounded network domain 29.

Each superagent 23 is a client that serves as a localized data repository that stores the downloaded patch and DAT 24 in a local storage device 25. Each superagent 23 multicasts the downloaded patch and DAT 24 to select agents 26a–c in a hierarchical manner. The replicator 11 and superagent 23 are further described below with reference to FIGS. 3 and 4, respectively.

Each component in the distributed computing environment 10 executes a layered network protocol stack for processing different types of packets, including packets compliant with the Internet Protocol (IP) and Transmission Control Protocol (TCP). To ensure efficient delivery of the patches and DATs, the updated components are encoded using Reed-Solomon encoding, which provides block-based error correction and data recovery. When so encoded, the replicator 11 can receive the new patches and DATs 17 using the User Datagram Protocol (UDP), as well as HTTP and FTP.

The individual computer systems, including servers 12, 13, replicator 11, superagent 23, and agents 26a–c are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

Figure 2:
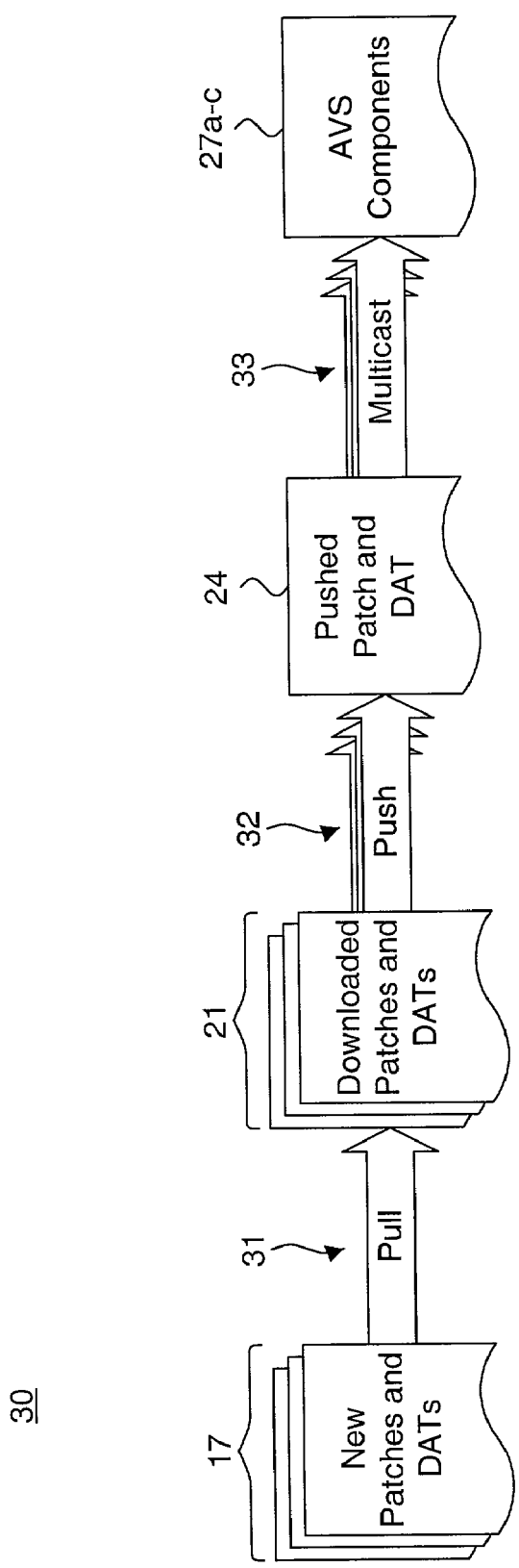
FIG. 2 is a process flow diagram showing automated computer anti-virus application component updates using the system of FIG. 1.

FIG. 2 is a process flow diagram showing automated computer anti-virus application component updates 30 using the system of FIG. 1. Periodically, the repository 11 (shown in FIG. 1) identifies and pulls (transition 31) new patches and DATs 17 from, by way of example, the HTTP server 12. Alternatively, the new patches and DATs 17 can be pulled from the FTP server 13 or other form of server, as would be recognized by one skilled in the art. The downloaded patches and DATs 21 are then pushed (transition 32) to one or more superagents 23 (shown in FIG. 1) and subsequently multicast (transition 33) to the various agents 26a–c for installation and configuration as anti-virus system components 27a–c.

Figure 3:
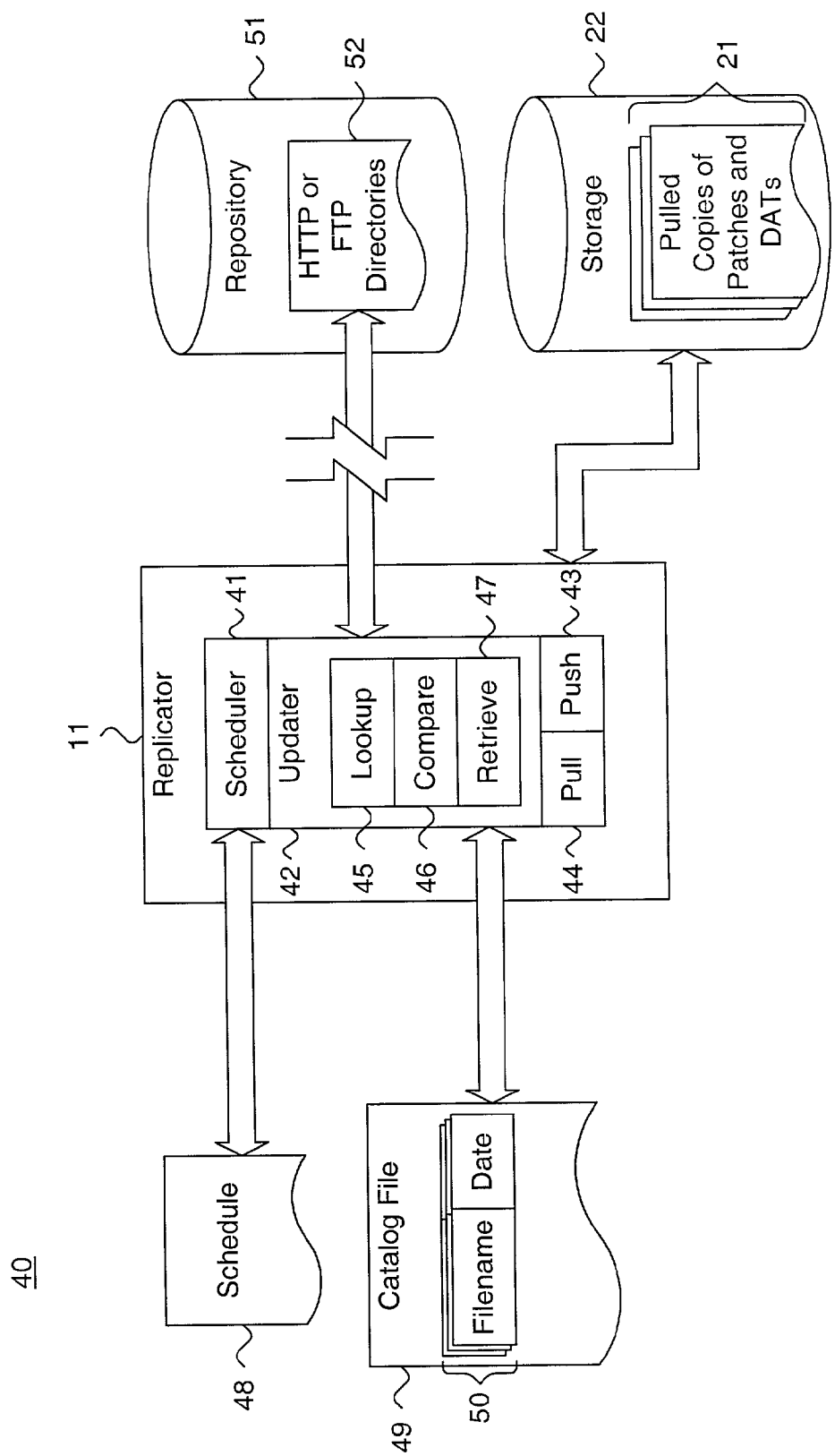
FIG. 3 is a functional block diagram showing the software modules of the replicator of FIG. 1.

FIG. 3 is a functional block diagram showing the software modules 40 of the replicator 11 of FIG. 1. The replicator 11 initiates and orchestrates the updating of the anti-virus system components 27a–c on a periodic and substantially regular basis. In addition, the replicator 11 can form an update cycle on an ad hoc basis for those clients that fail to receive periodic updates due to system downtime or unavailability.

A scheduler module 41 initiates an updating cycle in accordance with a predefined schedule 48. At each scheduled interval, the scheduler 41 awakens an updater module 42 which begins an updating cycle. A lookup submodule 45 obtains the current HTTP or FTP directories 52 maintained on-line in the repository 51 of the appropriate HTTP server 12 or FTP server 13 (shown in FIG. 1) through an ICMP "ping" message. In addition, the ICMP "ping" mechanism can be used to find the nearest repository for optimal bandwidth utilization. A set of three "ping" messages are sent and the average "ping" response time is determined. If the server does not support ICMP, a standard HTTP or FTP connection is attempted and the connection time recorded and averaged.

Individual ICMP messages are transmitted with an IP datagram and consist of a 20-byte IP header and variable length message, such as described in W. R. Stephens, "TCP/IP Illustrated," Vol. 1, "The Protocols," Chs. 1–2, 6, Addison Wesley Longman, Inc. (1994), the disclosure of which is incorporated by reference.

Upon receiving the HTTP or FTP) directories 52, a compare submodule 46 compares the directory entries against a catalog file 49 in which is stored a set of records 50 identifying the file name and date of each deployed anti-virus component 27a–c. Those anti-virus system components 27a–c requiring an update are retrieved through a retrieve submodule 47. The actual downloading of the updating anti-virus system components is effected by a pull module 44 which pulls copies of the new patches and DATs 17 (shown in FIG. 1) from the appropriate repository 51 for storage as pulled copies of patches and DATs 21 in an associated storage device 22.

Upon receiving the pulled copies of patches and DATs 21, the replicator 11 disseminates the updates using a push module 43 which pushes a copy of the new patches and DATs 17 to one or more superagents 23 (shown in FIG. 1) for further dissemination.

Figure 4:
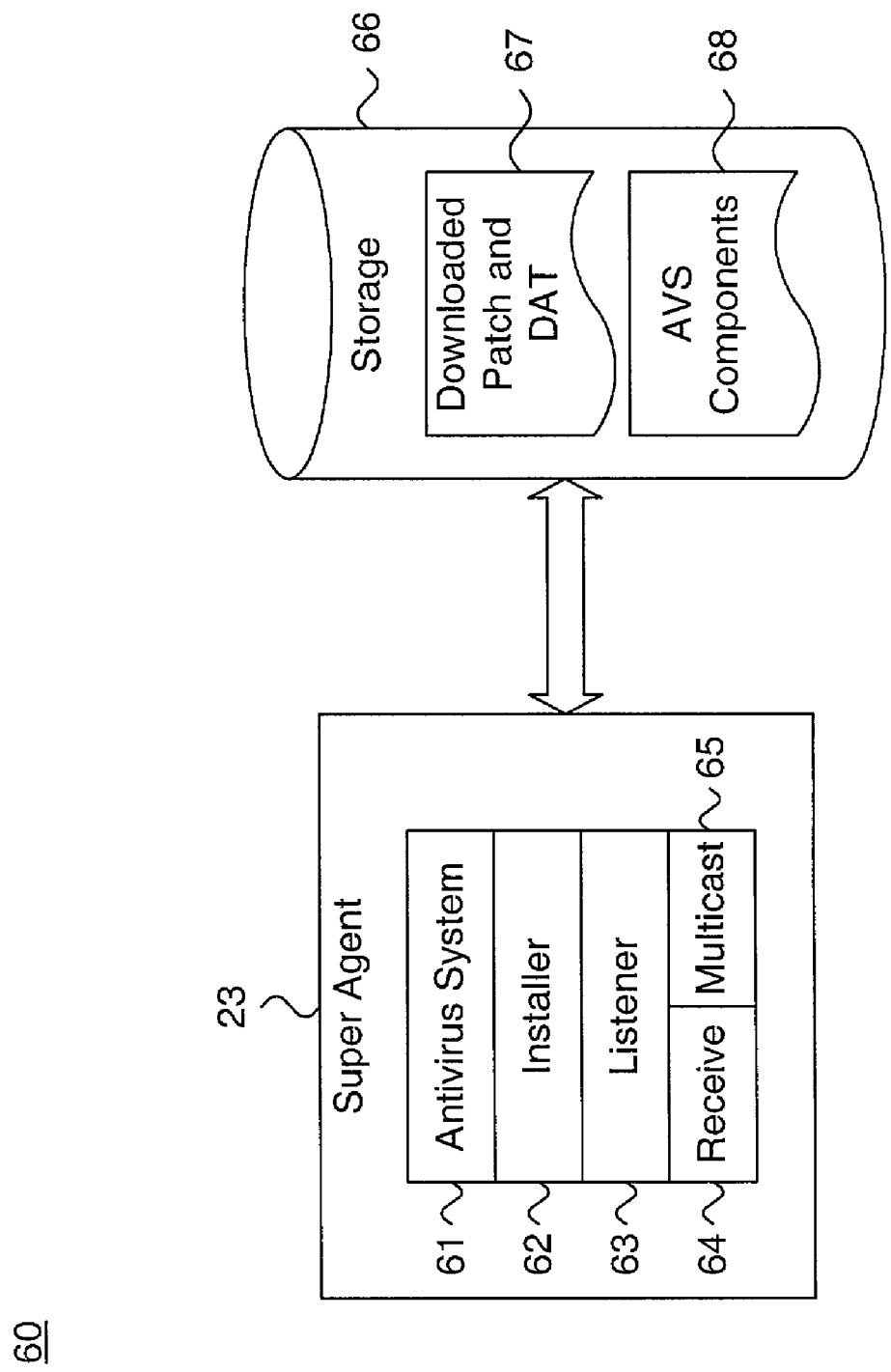
FIG. 4 is a functional block diagram showing the software modules of the superagent of FIG. 1.

FIG. 4 is a functional block diagram showing the software modules 60 of the superagent 23 of FIG. 1. The superagent 23 executes a listener module 63 which allows the superagent 23 to asynchronously receive new patches and DATs from the replicator 11. Upon detecting a new set of updates, the superagent 23 receives the update through a receive module 64 which stores the downloaded patch and DAT 67 in the associate storage device 66. The superagent 23 then disseminates a single copy of the downloaded patch and DAT 67 to one or more agents 26a–c (shown in FIG. 1) through a multicast using a multicast module 65. Multicasting enables a single copy of the updates to be efficiently sent to a select set of agents 26a–c within the bounded network domain 29 by using a pre-designated network address to efficiently reference the selected agents 26a–c in a controlled and specific manner.

Following multicasting, the superagent 23 executes an installer module 62 to install the downloaded patch and DAT 67 into the anti-virus system components 68. The anti-virus system 61 is then updated.

Figure 5:
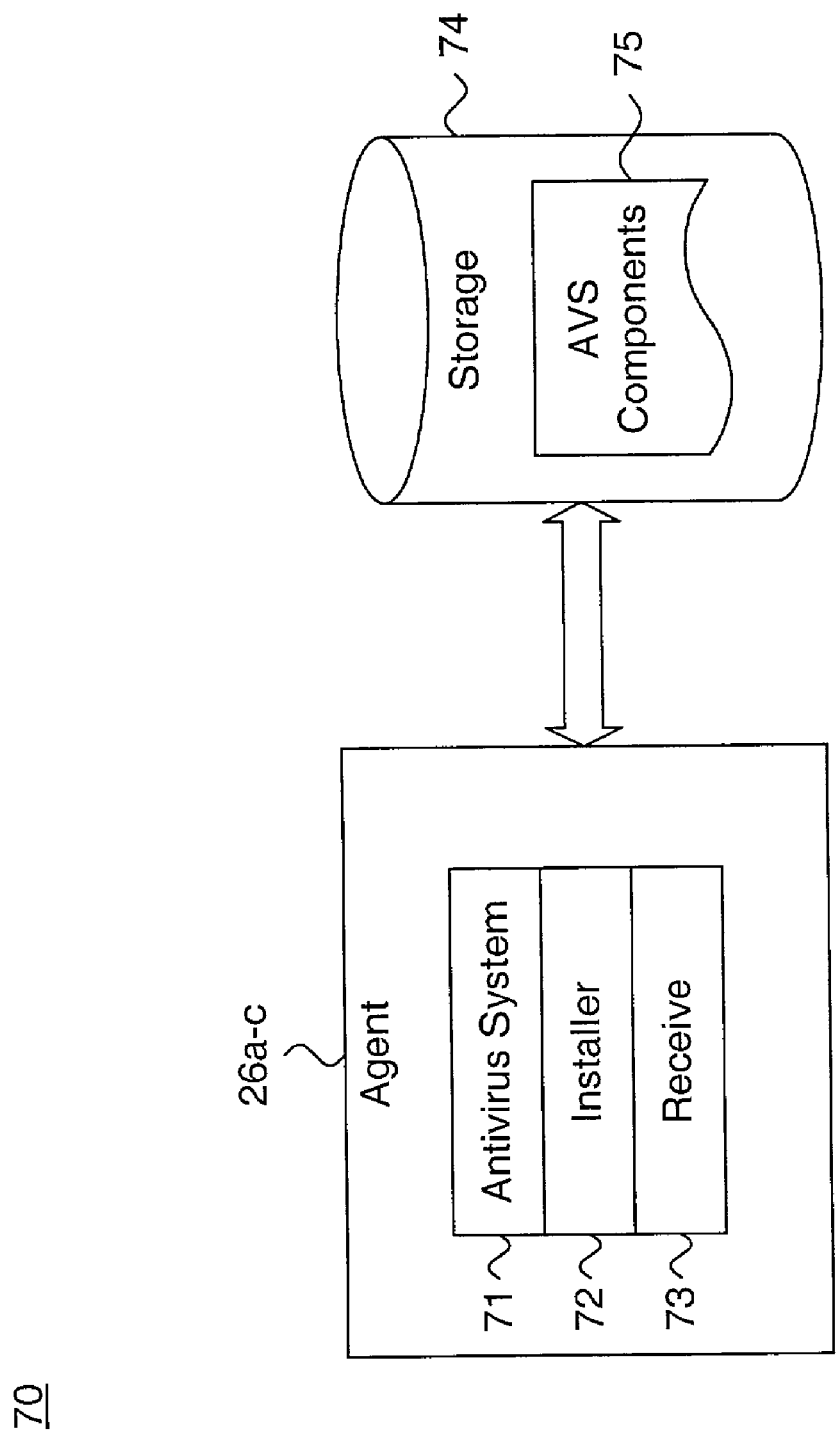
FIG. 5 is a functional block diagram showing the software modules of the agent of FIG. 1.

FIG. 5 is a functional block diagram showing the software modules 70 of the agent 26a–c of FIG. 1. Each agent 26a–c includes the functionality of a superagent 23 and only those components relevant to the ordinary agent functions are described and shown. Each agent 26a–c executes an anti-virus system 71 to identify and counter computer viruses, malware, and other bad content, as is known in the art. Updates to the anti-virus system components 75 are periodically received through a receive module 73 from a superagent 23. An installer module 72 then installs each new patch and DAT to update the anti-virus system 71.

Each module in the replicator 11, superagent 23 and agent 26a–c is a computer program, procedure or module written as source code in a conventional programming language, such as the C++ programming language, and is presented for execution by the CPU as object or byte code, as is known in the art. The various implementations of the source code and object and byte codes can be held on a computer-readable storage medium or embodied on a transmission medium in a carrier wave. The modules of the replicator 11, superagent 23, and agents 28a–c operate in accordance with a sequence of process steps, as further described below with reference to FIGS. 6–8, respectively.

Figure 6:
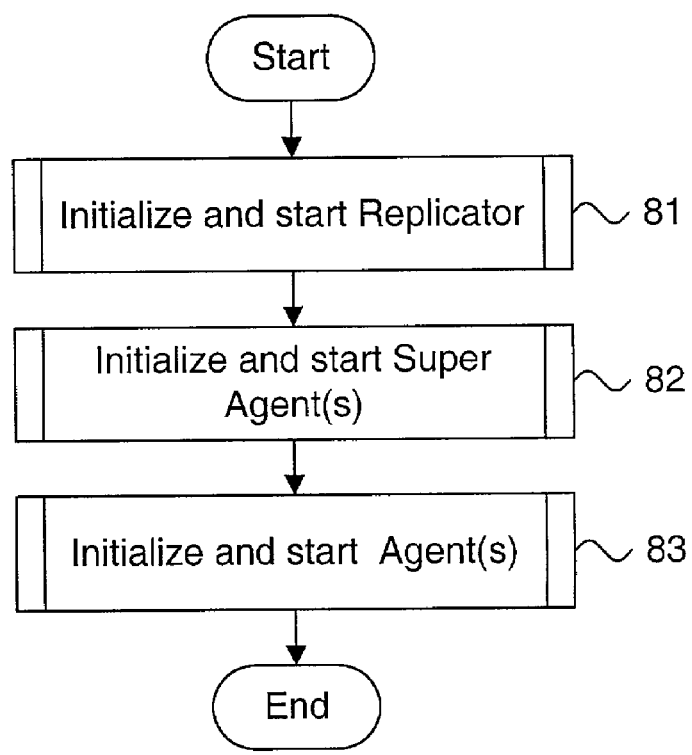
FIG. 6 is a flow diagram showing a method for providing automated low bandwidth updates of computer anti-virus application components, in accordance with the present invention.

FIG. 6 is a flow diagram showing a method for providing automated low-bandwidth updates 80 of computer anti-virus application components 27a–c (shown in FIG. 1), in accordance with the present invention. The replicator 11, superagent 23, and agents 26a–c execute as independent clients within the bounded network domain 29 (shown in FIG. 1). Each of these systems, including the replicator 11, superagent 23, and agents 26a–c, are logically initialized and started (blocks 81–83) and processing continues until the last of these systems has terminated.

Figure 7:
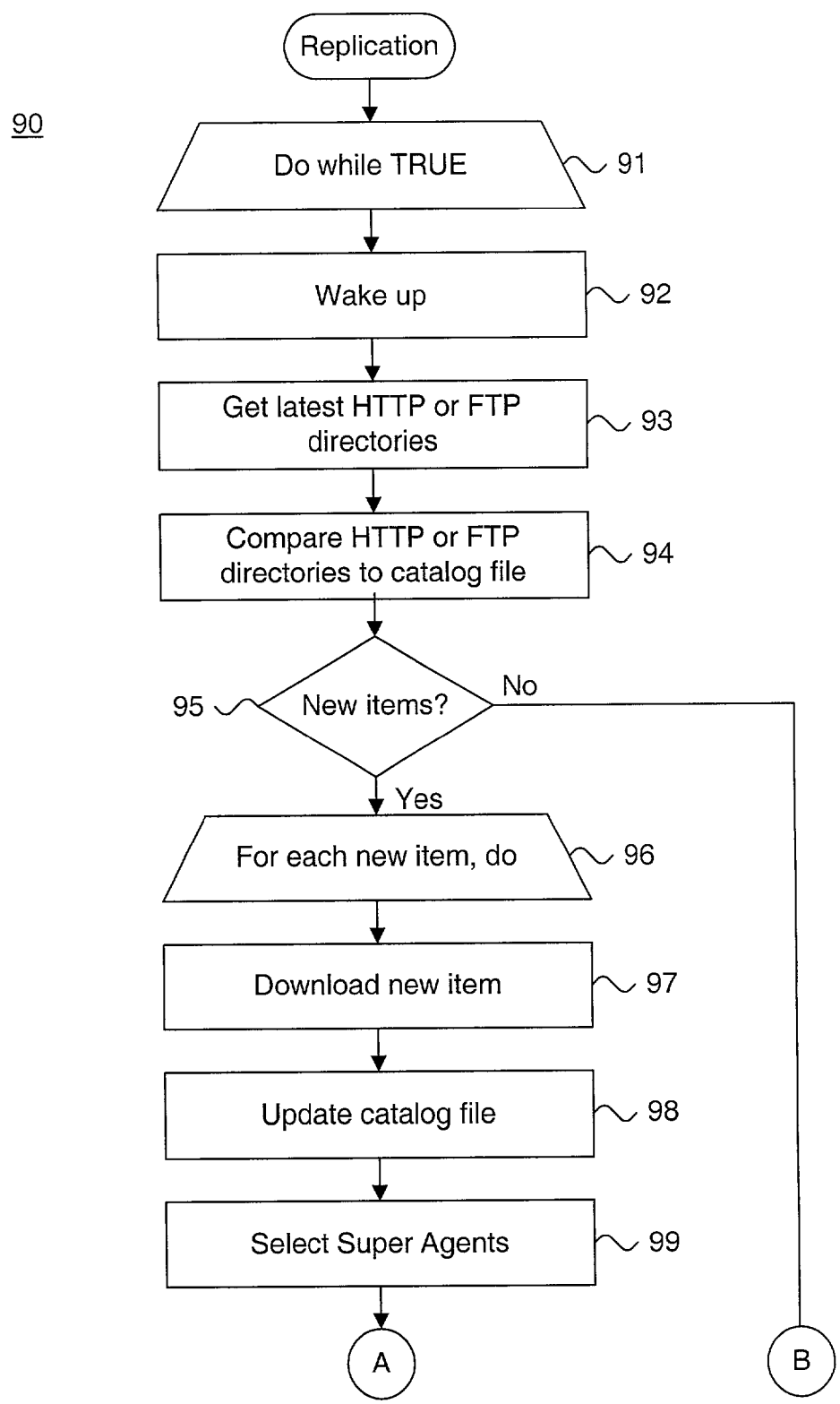
FIG. 7 is a flow diagram showing the operations performed by the replicator of FIG. 3.

FIG. 7 is a flow diagram showing the operations 90 performed by the replicator 11 of FIG. 3. The purpose of this routine is to periodically awaken and retrieve the latest updates to the anti-virus system components 27a–c (shown in FIG. 1) on an asynchronous and independent basis.

Each updating cycle is performed through a continuous processing loop (blocks 91–102), as follows. During each cycle (block 91), the replicator 11 awakens (block 92), preferably in accordance with a predefined schedule 48 (shown in FIG. 3). The latest HTTP or FTP directory 52 is obtained (block 93), preferably though an ICMP "ping" message, and compared to the records 50 in the catalog file 49 (block 94). If new items, that is, patches and DATs (shown in FIG. 1), are present (block 95), each new item is iteratively processed (blocks 96–101), as follows.

First, the new item is downloaded (block 97) and the appropriate record 50 in the catalog file 49 is updated (block 98). Following downloading, the appropriate superagent 23 (shown in FIG. 1) is selected (block 99) and the new item is pushed to the superagents 23 (block 100). Iterative processing continues (block 101) for each remaining new item. As well, a new update cycle begins (block 102) upon the completion of the processing of any remaining new items. The routine returns when the replicator 11 exits or is terminated.

Figure 8:
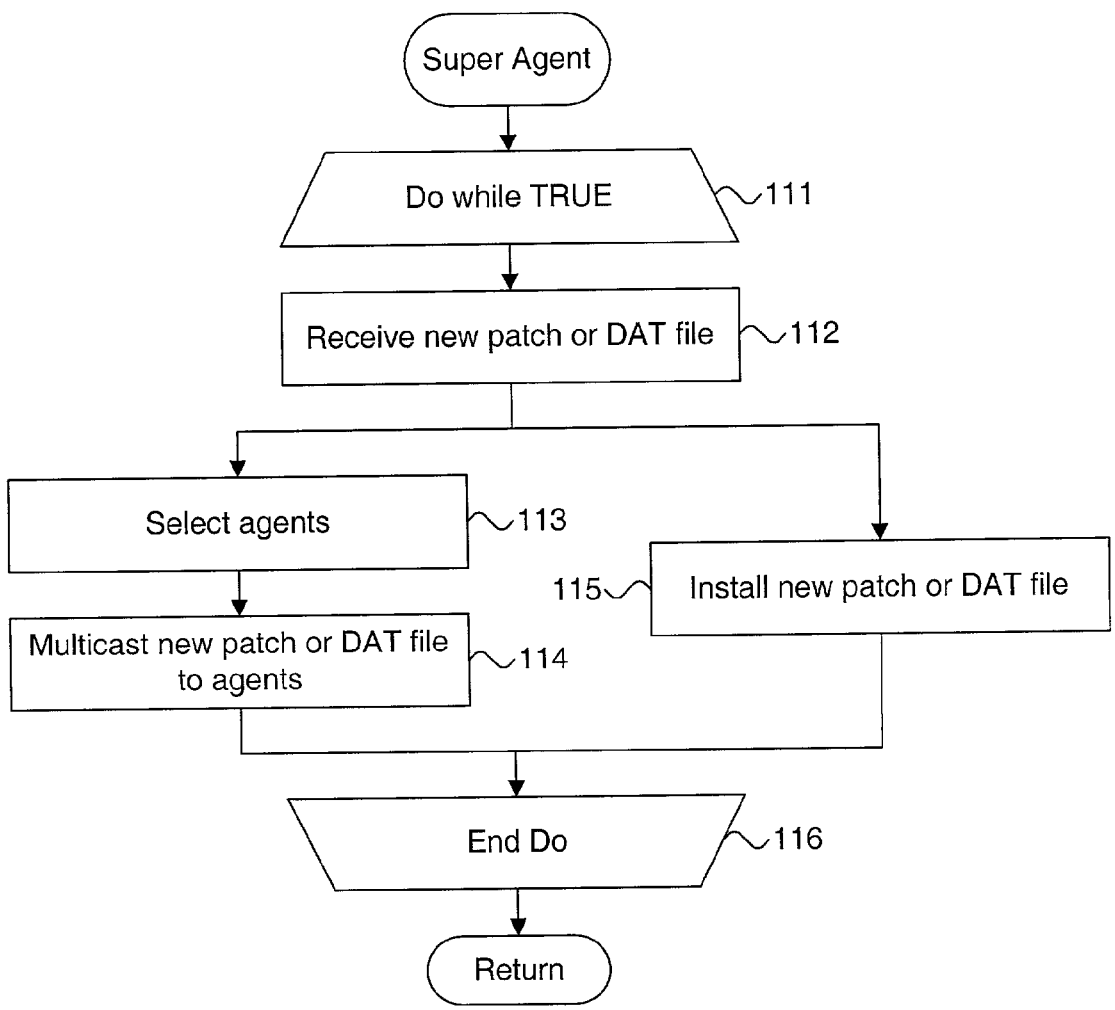
FIG. 8 is a flow diagram showing the operations performed by the superagent of FIG. 4.

FIG. 8 is a flow diagram showing the operations 110 performed by the superagent 23 of FIG. 4. The purpose of this routine is to asynchronously receive new items containing patches and DATs 17 (shown in FIG. 1) for the deployed anti-virus components 27a–c and to multicast and install as appropriate. For clarity, the ongoing operations of the anti-virus system 61 is omitted.

Each superagent 23 executes a continuous processing loop (block 111–116), as follows. During each processing cycle (block 111), a new patch or DAT file 17 is received (block 112) and simultaneously multicast to select agents 26a–c (block 113–114) and installed (block 115). The update cycle continues (block 116) indefinitely and the routine returns when the superagent 23 exits or is terminated.

Figure 9:
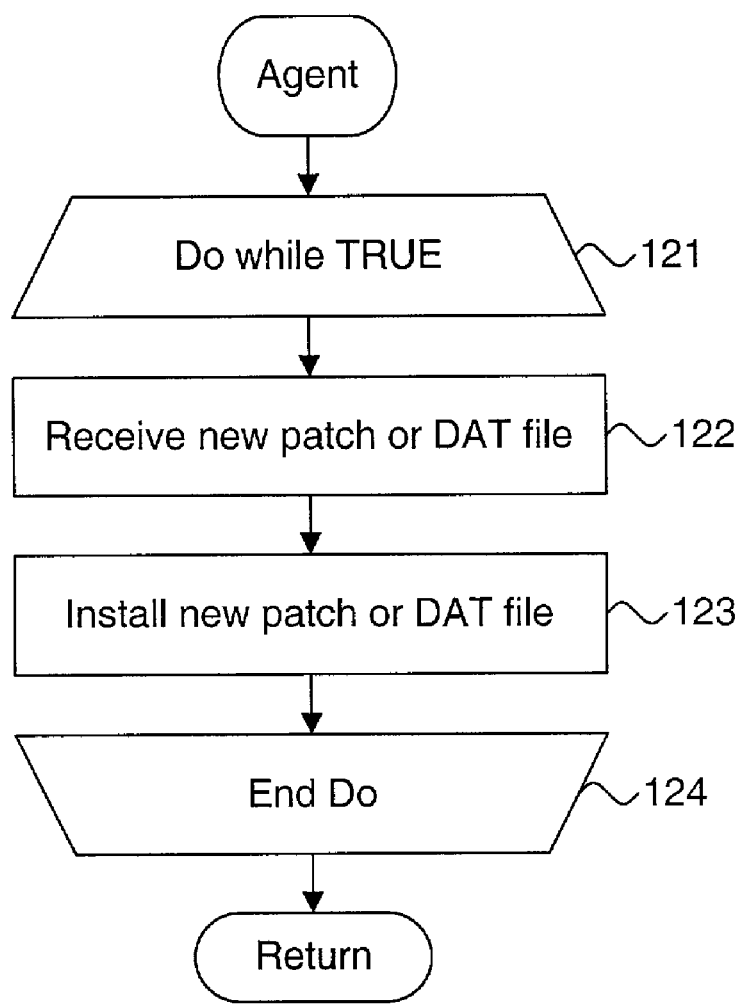
FIG. 9 is a flow diagram showing the operations performed by the agent of FIG. 5.

FIG. 9 is a flow diagram showing the operations 120 performed by the agent 26a–c of FIG. 5. The purpose of this routine is to receive and install new patches and DATs 17 (shown in FIG. 1). For clarity, the ongoing operations of the anti-virus system 71 is omitted.

The agent 26a–c executes a continuous processing loop (blocks 121–124), as follows. During each processing cycle (block 121), the new patch or DAT file 17 is received and installed (blocks 122–123). Processing continues (block 124) indefinitely. The routine returns when the agent 26a–c exits or is terminated.

While the invention has been particularly shown and described as referenced to the embodiments thereof, those skilled in the art will understand that the foregoing and other changes in form and detail may be made therein without departing from the spirit and scope of the invention.

What is claimed is:

1. A system for efficiently disseminating computer anti-virus system components, comprising:
    a server maintaining a repository of computer anti-virus system components cataloged in an on-line directory;
    a replicator periodically accessing the on-line directory to identify those computer anti-virus system components in deployed clients requiring updating and pulling and forwarding the identified computer anti-virus system components to select superagents within a defined network domain; and
    superagents multicasting the identified computer anti-virus system components to each deployed client;
    wherein the multicasting enables a single copy of the identified computer anti-virus system components to be efficiently sent to a selected set of agents within the defined network domain by using a pre-designated network address to efficiently reference the selected set of agents;
    wherein the superagents are dynamically selected within the defined network domain.

2. A system according to claim 1, further comprising:
    at least one of the superagents and the agents installing and configuring the computer anti-virus system components.

3. A system according to claim 1, wherein the identified computer anti-virus system components are pulled via at least one of HTTP, FTP, and UDP.

4. A system according to claim 1, further comprising:
    a lookup module obtaining the on-line directory through query messages.

5. A system according to claim 4, wherein the ICMP messages are exchanged as the query messages.

6. A system according to claim 1, wherein a lookup submodule obtains a current online directory maintained in the repository of the server by utilizing an ICMP ping message.

7. A system according to claim 6, wherein the ICMP ping message obtains a nearest repository for optimal bandwidth utilization.

8. A system according to claim 7, wherein an average ping response time is determined.

9. A system according to claim 1, wherein the clients each include the functionality of at least one of the superagents.

10. A system according to claim 1, wherein each superagent multicasts the identified computer anti-virus system components to each deployed client in a hierarchical manner.

11. A method for efficiently disseminating computer anti-virus system components, comprising:
    maintaining a repository of computer anti-virus system components cataloged in an on-line directory;
    periodically accessing the on-line directory to identify those computer anti-virus system components in deployed clients requiring updating;
    pulling and forwarding the identified computer anti-virus system components to select superagents within a defined network domain; and
    multicasting the identified computer anti-virus system components to each deployed client utilizing superagents;
    wherein the multicasting enables a single copy of the identified computer anti-virus system components to be efficiently sent to a selected set of agents within the defined network domain by using a pre-designated network address to efficiently reference the selected set of agents;
    wherein the superagents are dynamically selected within the defined network domain.

12. A method according to claim 11, further comprising:
    installing and configuring the computer anti-virus system components on at least one of the superagents and the agents.

13. A method according to claim 11, further comprising:
    pulling the identified computer anti-virus system components via at least one of HTTP, FTP, and UDP.

14. A method according to claim 11, further comprising:
    obtaining the on-line directory through query messages.

15. A method according to claim 14, further comprising:
    exchanging ICMP messages as the query messages.

16. A computer-readable storage medium holding code for performing the method according to claim 11, 12, 13, or 14.

17. A system for providing automated low bandwidth updates of computer anti-virus application components, comprising:
    a replicator periodically identifying components of one or more deployed computer anti-virus applications requiring updating and pulling each updated computer anti-virus application component from a component repository on a centralized component server; and
    a superagent updating each out-of-date computer anti-virus application component, comprising:
        a receive module receiving the one or more updated computer anti-virus application components for the computer anti-virus applications as pushed data; and a multicast module multicasting the updated computer anti-virus application components to the deployed computer anti-virus applications;

wherein the multicasting enables a single copy of the identified computer anti-virus application components to be efficiently sent to a selected set of agents within a defined network domain by using a pre-designated network address to efficiently reference the selected set of agents;

wherein a plurality of the superagents are dynamically selected within the defined network domain.

18. A system according to claim 17, further comprising:
an updater module inquiring of current computer anti-virus application component status at the centralized component server.

19. A system according to claim 18, further comprising:
a lookup submodule obtaining the current computer anti-virus application component status through messages implemented in the Internet Control Message Protocol and exchanged with the centralized component server.

20. A system according to claim 18, further comprising:
a lookup submodule accessing at least one of directory implemented in the File Transfer Protocol and the Hypertext Transport Protocol and listing the computer anti-virus application components.

21. A system according to claim 17, further comprising:
a catalog file identifying the deployed computer anti-virus application components.

22. A system according to claim 21, further comprising:
a set of records in the catalog file storing a file name and date for each deployed computer anti-virus application component.

23. A system according to claim 17, further comprising:
a scheduler executed periodically to initiate the updating of out-of-date computer anti-virus application components.

24. A system according to claim 23, further comprising:
a schedule designating a time period for each update by the scheduler.

25. A system according to claim 17, wherein the updated computer anti-virus application components are pulled as packets implemented in one of the Hypertext Transport Protocol and the File Transport Protocol.

26. A system according to claim 17, wherein the updated computer anti-virus application components are multicast as packets implemented in one of the Hypertext Transport Protocol, File Transport Protocol and User Datagram Protocol.

27. A system according to claim 17, wherein the updated computer anti-virus application components are encoded in the Reed Solomon encoding scheme.

28. A method for providing automated low bandwidth updates of computer anti-virus application components, comprising:
periodically identifying components of one or more deployed computer anti-virus applications requiring updating;
pulling each updated computer anti-virus application component from a component repository on a centralized component server; and
updating each out-of-date computer anti-virus application component, comprising:
pushing the one or more updated computer anti-virus application components for the computer anti-virus applications; and
multicasting the updated computer anti-virus application components to the deployed computer anti-virus applications utilizing superagents;
wherein the multicasting enables a single copy of the identified computer anti-virus application components to be efficiently sent to a selected set of agents within a defined network domain by using a pre-designated network address to efficiently reference the selected set of agents;
wherein the superagents are dynamically selected within the defined network domain.

29. A method according to claim 28, further comprising:
inquiring of current computer anti-virus application component status at the centralized component server.

30. A method according to claim 29, further comprising:
obtaining the current computer anti-virus application component status through messages implemented in the Internet Control Message Protocol and exchanged with the centralized component server.

31. A method according to claim 29, further comprising:
accessing at least one of directory implemented in the File Transfer Protocol and the Hypertext Transport Protocol and listing the computer anti-virus application components.

32. A method according to claim 28, further comprising:
maintaining a catalog file identifying the deployed computer anti-virus application components.

33. A method according to claim 32, further comprising:
storing a file name and date for each deployed computer anti-virus application component.

34. A method according to claim 28, further comprising:
executing a scheduler to periodically initiate the updating of out-of-date computer anti-virus application components.

35. A method according to claim 28, further comprising:
maintaining a schedule designating a time period for each update.

36. A method according to claim 28, further comprising:
pulling the updated computer anti-virus application components as packets implemented in one of the Hypertext Transport Protocol and the File Transport Protocol.

37. A method according to claim 28, further comprising:
multicasting the updated computer anti-virus application components as packets implemented in one of the Hypertext Transport Protocol, File Transport Protocol and User Datagram Protocol.

38. A method according to claim 28, further comprising:
encoding the updated computer anti-virus application components in the Reed Solomon encoding scheme.

39. A computer-readable storage medium holding code for performing the method according to claim 28, 31, 32, 34, 35, 36, 37, or 38.

* * * * *